(12) United States Patent
Stenfors

(10) Patent No.: US 9,664,454 B2
(45) Date of Patent: May 30, 2017

(54) VENTILATION DEVICE WITH ALTERNATING AIRFLOWS

(75) Inventor: Erik Stenfors, Hallstahammar (SE)

(73) Assignee: Tempeff North America Ltd., Wpg., MB (CA)

( * ) Notice: Subject to any disclaimer, the term of this patent is extended or adjusted under 35 U.S.C. 154(b) by 1053 days.

(21) Appl. No.: 12/994,778

(22) PCT Filed: Jan. 26, 2010

(86) PCT No.: PCT/SE2010/050069
§ 371 (c)(1),
(2), (4) Date: Nov. 26, 2010

(87) PCT Pub. No.: WO2010/085209
PCT Pub. Date: Jul. 29, 2010

(65) Prior Publication Data
US 2011/0076934 A1    Mar. 31, 2011

(30) Foreign Application Priority Data

Jan. 26, 2009  (SE) ........................ 0950028

(51) Int. Cl.
| F24F 11/00 | (2006.01) |
|---|---|
| F28D 17/04 | (2006.01) |
| F24F 12/00 | (2006.01) |

(52) U.S. Cl.
CPC ............ *F28D 17/04* (2013.01); *F24F 12/006* (2013.01); *Y02B 30/563* (2013.01)

(58) Field of Classification Search
CPC ........ F24F 3/1411; F24F 12/006; F28D 17/04
USPC ........................................ 454/239, 241, 252
See application file for complete search history.

(56) References Cited

U.S. PATENT DOCUMENTS

| 4,071,080 A * | 1/1978 | Bridgers .................. 165/59 |
| 4,391,321 A * | 7/1983 | Thunberg .................. 165/54 |
| 2007/0187073 A1 | 8/2007 | Ikegami et al. |
| 2007/0209385 A1 * | 9/2007 | Yabu ................ F24F 3/1411 62/480 |

FOREIGN PATENT DOCUMENTS

| EP | 1672290 | 6/2006 |
| EP | 1962030 | 8/2008 |
| GB | 1120421 | 7/1968 |
| JP | 2000074415 A * | 3/2000 |
| WO | 2004072559 | 8/2004 |
| WO | WO 2008047476 A1 * | 4/2008 ......... B60H 1/00478 |

OTHER PUBLICATIONS

Translation of WO2004072559.*

* cited by examiner

*Primary Examiner* — Steven B McAllister
*Assistant Examiner* — Jonathan Cotov
(74) *Attorney, Agent, or Firm* — Adrian D. Battison; Ade & Company Inc.

(57) ABSTRACT

The invention relates to a ventilation device (1) adapted to control the airflow paths of a first (3) and a second (5) airflow to alternately flow to or from a first and a second heat-absorbing body in order to achieve a heat transfer between the two airflows. The device comprises a first airflow channel (7) adapted to be connected with and lead an airflow to or from the first heat-absorbing body and a second airflow channel (13) adapted to be connected with and lead an airflow to or from the second heat-absorbing body.

1 Claim, 4 Drawing Sheets

VENTILATION DEVICE WITH ALTERNATING AIRFLOWS

TECHNICAL FIELD

The present invention relates to a ventilation device adapted to control a first and a second airflow to alternately pass to or from a first and a second heat-absorbing body in order to achieve a heat transfer between the two airflows.

PRIOR ART

Heating and cooling the interior of buildings consumes large amounts of energy, generating costs both in terms of monetary and environmental losses. One source of energy loss is building ventilation where indoor air at a desired temperature is exchanged for outdoor air having a none-desired temperature, so that the introduced air must continuously be either heated or cooled. One method for decreasing the energy consumption comprises exchanging heat energy between the incoming and outgoing air. One such method comprises alternately letting the incoming and outgoing air heat and cool two heat energy absorbing bodies. For example, if the temperature of the outdoor air is cooler than the desired indoor air temperature, in a first state the cold, incoming air is heated by a first body, which has previously been heated by outgoing air, while the warm, outgoing air heats a second body, and in a second state, the incoming air is directed to pass through and be heated by the second body, while the outgoing air re-heats the first body.

One device commonly used for directing an incoming and an outgoing airflow to alternately pass through two heat-absorbing bodies comprises a box-like housing provided with four openings arranged one on each of the four sides of the housing, and one or more shutter plates arranged to rotate inside the housing for alternately directing the airflows between one of two openings to the heat-absorbing bodies. The device changes the path of an airflow by deflecting the airflow substantially perpendicularly relative to its previous flow direction. One drawback with this construction is that since the openings must necessarily be located one on each side of the housing due to the construction of the shutter plates, the air ducts leading to the device will extend in different directions, so that it becomes difficult and expensive to install the device in a ventilation system, especially in a pre-existing ventilation system.

In U.S. Pat. No. 7,059,385 another example of a ventilation device for alternating two airflows is shown. The device comprises two heat-absorbing bodies arranged in parallel and provided with rectangular openings for allowing an airflow therethrough. The openings are connected with two air ducts, such that each air duct covers half of both openings. The device further comprises rotating deflectors arranged between the bodies and the air ducts, and provided with two openings which each have an area of about one quarter of the deflector's surface area. By rotating the deflectors 90 degrees the two deflector openings are moved to allow airflow from only one of the air ducts to each body, and hence the airflows may be alternated through the bodies. One drawback with this device is that the airflow will mostly be concentrated to the half of the body which is open to the deflector opening. Thus the efficiency of the device will be decreased, especially since the deflector openings will allow communication with a different half of the body for each respective air flow. Furthermore, since the airflows are intended to be alternated about once every minute throughout the lifetime of the device, wear on the moving components of the ventilation device is quite severe, and it is both difficult and expensive to make a disc-like deflector resistant to fatigue.

Another problem within this field is that for large buildings huge volumes of air must be moved, requiring air ducts with large cross-sections. A ventilation device for alternating the flow paths must therefore also be large with large and heavy shutters or deflectors, increasing both wear and the energy consumption for turning the shutters or deflectors. In particular, it is difficult to manufacture a large deflector of the type in U.S. Pat. No. 7,059,385 for large volumes of air.

SUMMARY OF THE INVENTION

One object of the present invention is to indicate a ventilation device for alternating two airflow paths between two heat-absorbing bodies, which device is simple to install in a ventilation system.

Another object of the present invention is to indicate a ventilation device for alternating two airflow paths between two heat-absorbing bodies, which device has a large airflow capacity.

These objects are achieved with the ventilation device according to the preamble of claim 1, which is characterized in that the ventilation device comprises at least one first air passage between the first and the second airflow channels arranged for leading at least a part of a first airflow from the first airflow channel into the second airflow channel.

Thus it is possible to pass the first airflow from the first airflow channel, connected with the first body, and into the second airflow channel, connected with the second body, wherein the path of the first airflow is changed from passing through the first body to passing through the second body. Hence, rather than having to lead the airflow to a separate, box-like house provided with shutter plates for changing the path of the airflow to different openings in the house, or having to provide an expensive deflector in an interface between two air ducts and two heat-absorbing bodies, the invention comprises passing the airflow directly from the first airflow channel and into the second airflow channel.

Hence, the device may be designed to be very compact and small in relation to its flow capacity. Furthermore, since the airflow is passed from one channel and further into the other channel the size of the device may be nearly in the same range as two air ducts with the same flow capacity.

According to one embodiment, the openings of the airflow channels leading to the heat-absorbing bodies are designed to fit the size of the heat-absorbing bodies, so that each opening overlaps for at least a major part, and preferably covers at least 90%- 110%, and most preferably at least 97-103%, of the area of the opening to the body. Hence, the efficiency of the heat-exchange increases.

Furthermore, the device is simple to install into a pre-existing or a planned ventilation system. This is due to that the device can easily be adapted and fitted to the dimensions and/or shape of the ventilation system, since the channels may be provided at any position and may be oriented in any direction in relation to the external ventilation system. In particular, there is neither need for a separate housing with air ducts extending in all directions, nor of a deflector arranged in a complicated interface.

Another advantage is that the device according to the invention may be designed to have a large airflow capacity since both the air channels leading to the bodies and the air passage between the air channels may easily be designed having large cross-sections. Hence, the device is very efficient and is also both more simple and less costly to install and to manufacture.

A heat-absorbing body is preferably made with a material and shape adapted to efficiently transfer heat to, and absorb heat from, an airflow passing through the body. Preferably the body is designed to have a large surface area to allow the rapid transfer of heat energy to and from the airflow. According to one embodiment the body comprises a plurality of thin metal plates stacked together and arranged to form a multitude of air channels between the plates for conducting the airflows.

An airflow channel is considered to comprise any form of air duct, pipe, hose, or chamber intended to be connected with a heat-absorbing body with one end, either directly or indirectly via additional connection elements, and to be connected with an external ventilation system with the other end of the airflow channel. The external ventilation system preferably comprises either an intake or outlet for the airflow to the indoor or outdoor air, and correspondingly the airflow may be either incoming or outgoing air. The airflow channel is also preferably designed to form a single, continuous unit. The air passage between the first and the second airflow channels may correspondingly comprise an air duct, pipe or the like.

According to one embodiment the airflow channels are arranged to follow each others shapes. Preferably the airflow channels are further arranged with similar size and shape. Preferably the airflow channels are also arranged to be parallel. According to one embodiment the airflow channels are substantially straight and arranged to have substantially similar cross-sectional shape and area. Preferably the cross-sectional shape of the airflow channels is rectangular. Preferably the airflow channels are also arranged close to each other. More preferably the airflow channels are connected with each other along the length of the channels, so as to form one common unit. Preferably, the airflow channels are arranged to form two parallel airflow channels inside one common body of the ventilation device.

Throughout this application, for ease of description only and without invoking any limitations on the scope of protection, the first airflow channel is assigned to receive and/or exhaust the first airflow to or from a ventilation system via a first end of the first channel, while receiving and/or exhausting either the first or the second airflow at a second end, adapted to be connected with a first heat-absorbing body. Correspondingly, the second airflow channel is assigned to receive and/or exhaust the second airflow to or from the ventilation system via a first end of the second channel, while receiving and/or exhausting either the first or the second airflow at a second end, adapted to be connected with the second heat-absorbing body. It should be appreciated that the naming and numbering of the airflows, air channels, air passages, heat-absorbing bodies etc. is made only for descriptive purposes and is in all other respects arbitrary. Similarly, the airflows may flow through the air channels and bodies in both directions, depending on the manner in which the device is arranged in the ventilation system. Also, either of the first or second airflows could be incoming or outgoing air.

According to one embodiment the air passage comprises at most three passages arranged to collectively lead at least a major part, preferably at least 60%, and more preferably at least 90%, of the airflow through the air passage. Hence, the air passage is arranged to hold the airflow together in at most three large streams. According to one embodiment the air passage comprises one major passage arranged to lead at least a major part of the airflow in one single flow. Hence, the air passage is arranged to hold the airflow together in one large stream, so that at least half of the total airflow is kept together into one and the same stream. Preferably the air passage is arranged to hold the airflow together so that more than 60%, preferably more than 90%, and most preferably at least 95% of the airflow is kept together into the same, single stream. Preferably the air passage comprises only one single air passage, wherein the entire airflow is kept together in the same stream, apart from possible leakage. Preferably the cross-sectional area of an opening into the air passage is at least between 30-60% of the cross-sectional area of the airflow channel. Preferably the cross-sectional area of one single opening into the air passage is at least between 30-60% of the cross-sectional area of the airflow channel. Hence the pressure drop is considerably decreased. The measure of flow is here considered to follow the definition of mass/time.

According to one embodiment of the invention the ventilation device comprises at least one airflow control member adapted to control the flow of at least one airflow through the ventilation device, so that the alternation of the airflows to the heat-absorbing bodies may be controlled. An airflow control member may comprise a shutter plate, a damper, a deflector or a gas throttle valve, arranged to control, shut off or change the flow or the flow path of an airflow, depending on its present state. Preferably, at least one airflow control member is positioned inside the first or the second airflow channel. The inner volume of the airflow channels is large to allow large airflows. By positioning the airflow control member inside one of the channels, the large space in the channels is utilized, so that the device as a whole may be more compactly designed.

According to one embodiment of the invention the ventilation device comprises a first airflow control member adapted to admit the first airflow to flow into the second channel through the first air passage in a first, open state and to force the first airflow to continue through the first airflow channel in a second, closed state. Preferably, the first airflow control member is also adapted to prevent at least a major part, preferably at least 90%, and most preferably at least 98%, of the second airflow from entering the first air passage and the second airflow channel in its second, closed state. Thus the entering of the first airflow into the second airflow channel may be controlled. Also it may be ensured that at least a major part of the first airflow continues through the first air channel without leaking into the air passage in the second state of the first airflow control member. Thus mixing of the two airflows is decreased or may even be completely avoided.

According to another embodiment of the invention the ventilation device comprises a second airflow control member adapted to admit the first airflow to flow past the air passage and to continue through the first airflow channel in a first, open state, and to force the first airflow into the first air passage in a second, closed state, so as to prevent at least a major part of the first airflow from flowing through the first airflow channel in a second, closed state. Thus it may be ensured that at least a major part of the first airflow passes into the air passage and further into the second channel in the second state of the second airflow control member. Preferably, the second airflow control member is adapted to force at least 90%, preferably at least 98%, of the first airflow into the first air passage in its second state.

According to another embodiment of the invention the ventilation device comprises a control module adapted to control the first and the second airflow control members to alternate between being in the first and the second states, respectively, wherein the control module is further adapted to control the first and the second airflow control members to be in different states at the same time. Thus, when the first control member is in the open state admitting the first airflow into the air passage, the control module controls the second control member to be in the closed state so as to force the first airflow into the first air passage, and vice versa. Hence it is ensured that at least a major part, preferably at least 90%, and most preferably at least 98%, of the first airflow is led into the second airflow channel when the first airflow control member is in the first state, and continues in the first channel when the first airflow control member is in the second state. The control module may comprise a mechanical construction, a control circuitry and/or a computer with a computer program, or any suitable combinations thereof. The control module may also be divided into several pieces of equipment or may be integrated into only one piece.

According to one embodiment of the invention the ventilation device comprises a second air passage between the first and the second airflow channels arranged for leading at least a part of a second airflow from the second airflow channel and into the first airflow channel. Hence the path of the second airflow may also be changed to either continue in the second channel and further to the second body, or to be passed into the first channel and further to the first body. Preferably, the ventilation device also comprises a third airflow control member adapted to admit the second airflow to flow into the second air passage and further to the first airflow channel, in a first, open state, and to force the second airflow to continue through the second airflow channel in a second, closed state. Thus the third airflow control member prevents at least a major part, preferably at least 90%, and most preferably at least 98%, of the second airflow from flowing into the second air passage and further to the first airflow channel, in the second, closed state. Preferably, the first and second airflow control members are shaped to each cover at least between 30-60% of the internal, cross-sectional area of the respective airflow channels in their closed states.

According to one embodiment the two airflow passages are preferably arranged side-by-side. Preferably the air passages are also parallel to each other. Preferably the device comprises a wall separating the first and second air passages from each other, so that the airflows flow one on either side of the wall. Thus the wall separates the two airflows from each other. Preferably, the air passage or air passages are arranged to hold each, respective airflow together into at least one large, airflow, so that at least half of each, respective airflow is kept together into one and the same stream, respectively. Preferably the air passage or air passages are arranged to hold each, respective airflow together so that more than 60%, preferably more than 90%, and most preferably at least 95% of each, respective airflow is kept together into the same, single airflow. By keeping each of the airflows together rather than letting the airflow be divided into a plurality of smaller flows, there is less heat transfer between the airflows when the airflows passes through the air passages. Hence, there is less difference in heat transfer between the airflows depending on whether the airflows are directed through the air passage or straight through the air channels. Preferably, the air passage comprises two or less, more preferably only one, separating wall separating the two airflows to flow on either side. Thus there is provided a small surface area between the two airflows in order to achieve a low heat transfer.

According to one embodiment of the invention the ventilation device comprises a fourth airflow control member adapted to admit the second airflow to flow past the second air passage and to continue through the second airflow channel in a first, open state, and to force the second airflow into the second air passage in a second, closed state, so as to prevent at least a major part of the second airflow from flowing through the second airflow channel. Thus at least a major part of the second airflow is forced to pass into the first airflow channel and further to the first heat-absorbing body in the second state of the fourth control member. Preferably the fourth airflow control member is adapted to force a major part, preferably at least 90%, of the second airflow into the first channel in the closed state, and most preferably at least 98%. Preferably the device also comprises a control module adapted to control the third and the fourth airflow control members to alternate between being in the first and the second states, respectively, wherein the control module is further adapted to control the third and the fourth airflow control members to be in different states at the same time. The airflow control members are hence arranged to redirect the airflows to alternately pass straight through the ventilation device through the first and second airflow channels respectively, and to be interchanged, so that the airflows passes into the other of the airflow channels via the air passages.

According to one embodiment of the invention the ventilation device comprises a control member adapted to control the first and the third airflow control members to alternate between being in the first and the second states, respectively, wherein the control module is further adapted to control the first and the third airflow control members to be in the same states at the same time. Thus the control module couples the first and third airflow members to each other, so that the first and the second airflows simultaneously will be directed into the first and second air passage, respectively, when the first and third airflow control members are in their first, open states. Preferably the control module is also adapted to control the second and fourth airflow control members to be in the same states at the same time, and to be in opposite states relative to the first and the third airflow control members. Thus, the airflow control module controls the first, second, third and fourth airflow control module so that the first and the second airflow will simultaneously be either allowed into the respective air passage and be prevented from continuing in the first and second airflow channels, or to be allowed to continue in the first and second airflow channels, respectively, while being prevented from entering the air passages.

According to one embodiment of the invention at least one of the airflow control members comprises a shutter plate mounted on a rotatable shaft, so that the airflow control member is rotatable between its first and its second state. Preferably, all four airflow control members comprise one shutter plate each, mounted on a shaft. Preferably, the shaft is arranged to pass substantially in the middle of the shutter plate and in the same plane as the shutter plate, wherein the shutter plate is balanced on the shaft, and the moment of inertia during a rotation is low. In another embodiment the shaft may be arranged along one end of the shutter plate, wherein the shutter plate may be rotated through a smaller angle, while retaining its function.

According to one embodiment of the invention the first and the fourth airflow control members are mounted on the same shaft, so that the first and fourth airflow control members rotate with each other. Thus it is possible to turn the control members mounted on the same shaft between their first and second states, by rotating only one shaft and with only one drive unit. Preferably, the second and the third airflow control members are also jointly mounted on a second shaft. However, for very large ventilation devices the shutter plates may become heavy, wherein it is preferred to mount each shutter plate on an individual shaft.

According to one embodiment of the invention the ventilation device comprises a first casing comprising an inner hollow defining the first airflow channel, and a second casing comprising an inner hollow defining the second airflow channel, wherein the first and the second casings are joined for at least a portion of the length of the first and second airflow channels. In one embodiment the casings are joined by being held together. In another embodiment the casings are joined by being separated by a common partition wall. In yet another embodiment the first and second casings are integrated into a single, common casing, and the airflow channels are separated by a partition wall arranged inside the common casing. Thus, the distance between the airflow channels is small for these portions, so that the ventilation device is more compact and occupies less space. Preferably, the air passages are arranged in connection with the joined portions, so that the air passages are short. Thus, the airflows need not travel a long distance through the air passages before reaching into the other channel.

According to one embodiment of the invention the first and the second airflow channels are separated by a partition wall for at least a portion of the length of the channels, wherein the air passage comprises an opening in the partition wall. Thus the air passage is very short, and the device may be very compactly designed. Preferably, the partition wall is common for both airflow channels, so that the partition wall forms a wall in both channels. Hence the distance between the airflow channels is minimized.

Preferably the first air passage comprises an opening to the first airflow channel having a width, which is smaller than or equal to the width of the airflow channel. Preferably, the width of the opening is smaller than or equal to half of the width of the wall surface in which the opening is arranged. Preferably the opening is furthermore positioned to one side of the wall surface, as seen in the longitudinal direction thereof. Preferably, the second air passage also comprises a second opening to the first airflow channel having a width, which is smaller than or equal to the width of the airflow channel. Preferably the second opening is positioned on the other half of the wall surface, wherein both openings may be located side-by-side. Preferably the device further comprises an internal wall arranged to separate the two openings, so that different airflows may pass through the two openings without mixing. Preferably the wall is arranged inside either or both of the first and the second airflow channels, in order to prevent mixing of the airflows.

According to one embodiment of the invention the ventilation device comprises at least one internal wall arranged to prevent at least a major part of one of the airflows from entering an air passage. Preferably, the internal wall is arranged to at least partly surround the opening to the air passage inside one of the air channels. Thus, mixing of the two airflows is at least partly prevented. According to one embodiment of the invention the at least one internal wall is arranged to cooperate with at least one of the airflow control members for preventing at least a major part of at least one airflow from entering an air passage.

Preferably, the internal wall comprises a first wall part arranged to extend across and to cover at least between 30-60% of the internal cross-section area of the airflow channel. The cross-section area is here intended to be the cross-section area perpendicular to the extension of the channel. The first wall part may be arranged perpendicular to the extension of the airflow channel. In another embodiment the first wall part may be arranged obliquely relative to the length direction of the airflow channel, wherein the pressure drop may be decreased. The first wall part hence forces the airflow into the uncovered half of the airflow channel.

Preferably the internal wall defines an opening for letting the airflow out of or into the air passage, which opening is covered by an airflow control member. Hence the airflow may be regulated and controlled by changing the state of the airflow member. Preferably the internal wall is arranged to surround the opening in cooperation with a wall of the casing and/or a flow control member to at least 95%. Preferably, the first part of the internal wall is shaped as one, wall-to-wall piece, wherein at least a major part, preferably at least 90%, of the airflow is held together into one single airflow stream.

According to one embodiment the internal wall comprises a second wall part arranged to separate the first and second airflows from each other. Preferably the second wall part is arranged in the longitudinal direction of the airflow channel, and/or in the direction of the airflow through the ventilation device. In case the airflow passages are openings in the partition wall the second wall part is preferably arranged at least partly around the opening, and to separate the openings and the air passages from each other. Preferably the internal wall then forces the airflows into their correct opening.

According to one embodiment of the invention the ventilation device is arranged to alternate between a first state, in which the ventilation device directs the first and the second airflows to pass straight through the first and the second airflow channels, respectively, and a second state, in which the ventilation device directs the first and the second airflows to enter a first and a second air passage arranged between the first and the second airflow channels, so that the first airflow flows from the first airflow channel and into the second airflow channel through the first air passage, and the second airflow flows from the second airflow channel and into the first airflow channel through the second air passage. Hence it is ensured that the two airflows alternate between passing through the first and the second heat-absorbing bodies, respectively, in order to regenerate heat and save costs.

According to one embodiment of the invention the device is adapted in size so as to allow a first airflow of at least 5 000 m$^3$/min, preferably at least 7 000 m$^3$/min, and most preferably at least 10 000 m$^3$/min, based on an air pressure of at the most 2 Bar inside the airflow channel. Preferably the device is further adapted in size so as to simultaneously allow a second airflow of at least 5 000 m$^3$/min, preferably at least 7 000 m$^3$/min, and most preferably at least 10 000 m$^3$/min, based on an air pressure of at the most 2 Bar inside the airflow channel. Thus the capacity of the device is suitable for very large airflows and large ventilation systems.

According to another aspect the invention relates to a ventilation arrangement comprising a first ventilation device as described above, and a heat-absorbing module comprising a first and a second heat-absorbing bodies connected with the first and the second airflow channels in the first ventilation device with a first end, and a second ventilation device similarly adapted to control the airflow paths of the first and the second airflows to alternately flow to or from the first and the second heat-absorbing bodies and which is connected with the second end of the first and second heat-absorbing bodies. Thus one airflow control device is arranged on either side of the heat-absorbing module. The second ventilation device is preferably also designed according to the above, but may also have another designed.

Preferably, both the first and the second ventilation devices are adapted to receive or exhaust each airflow via one and the same opening at all times to a surrounding ventilation system. Thus, the airflows will be received or exhausted to or from the same air duct in the external ventilation system, so that the air ducts connected to the devices may always carry the same airflow and always in the same direction. Thus the device may be positioned far from either or both of the intake or outlet to the indoor air or the outdoor air, without increasing the volumes of air that need to be moved through the air ducts when alternating the airflows, before the new air reaches the heat absorbing bodies. Hence the ventilation arrangement may be positioned in one part of a building while the intake or outlet for the ventilation system is positioned in another part. In particular, it is an advantage to install the ventilation arrangement in the cellar of a building while positioning the intake or outlet on the roof of the building.

In another embodiment of the present invention, two or three such ventilation devices and/or heat absorbing modules may be arranged within the same housing, forming a separate unit. This gives the advantage that the entire unit may be removed or replaced for maintenance or repair.

BRIEF DESCRIPTION OF THE ATTACHED DRAWINGS

The invention is now to be described as a number of non-limiting examples of the invention with reference to the attached drawings.

FIG. 1b shows a view from above depicting the upper airflow channel in the ventilation device shown in FIG. 1a.

FIG. 1d shows a front view of the device in FIG. 1a.

DETAILED DESCRIPTION

Figure 1A:
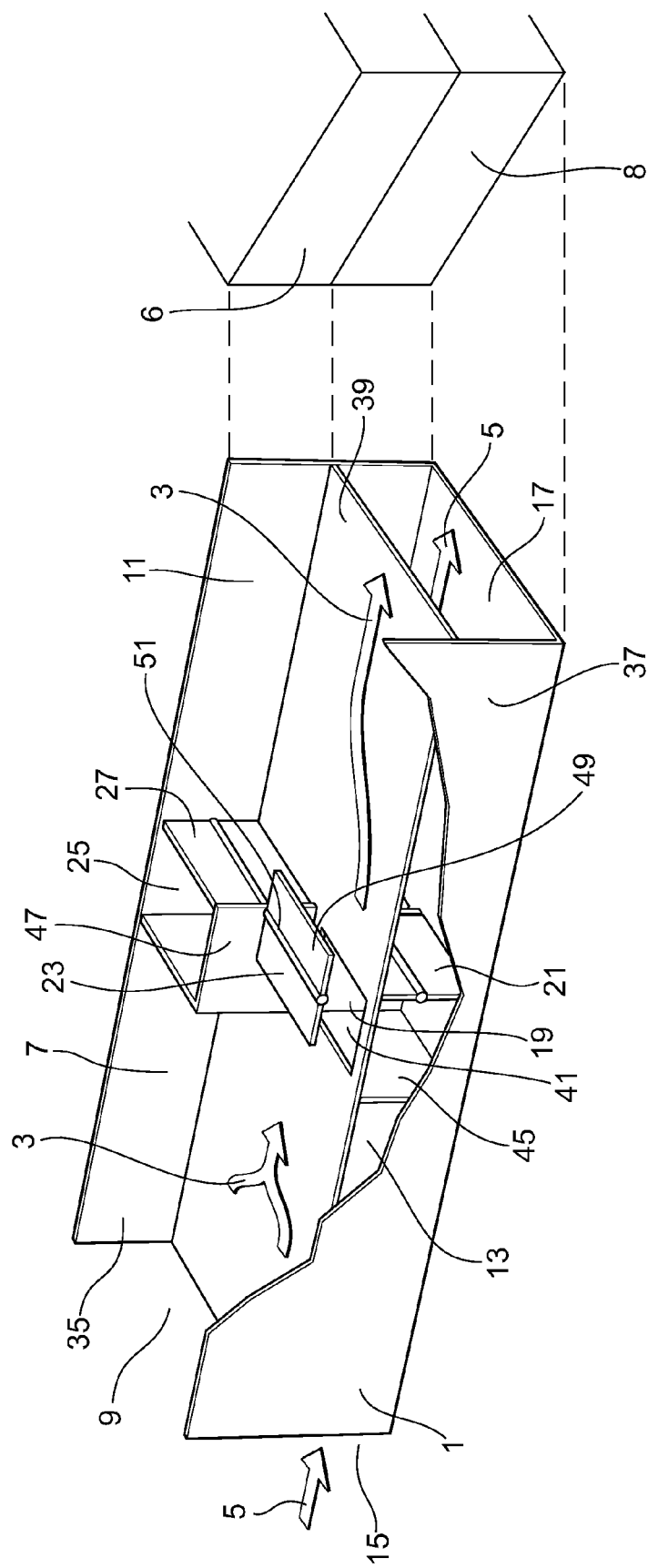
FIG. 1a shows a perspective view of a ventilation device in a first state according to one example of the invention, and having part of its side-wall and roof cut open to increase visibility.
Figure 1B:
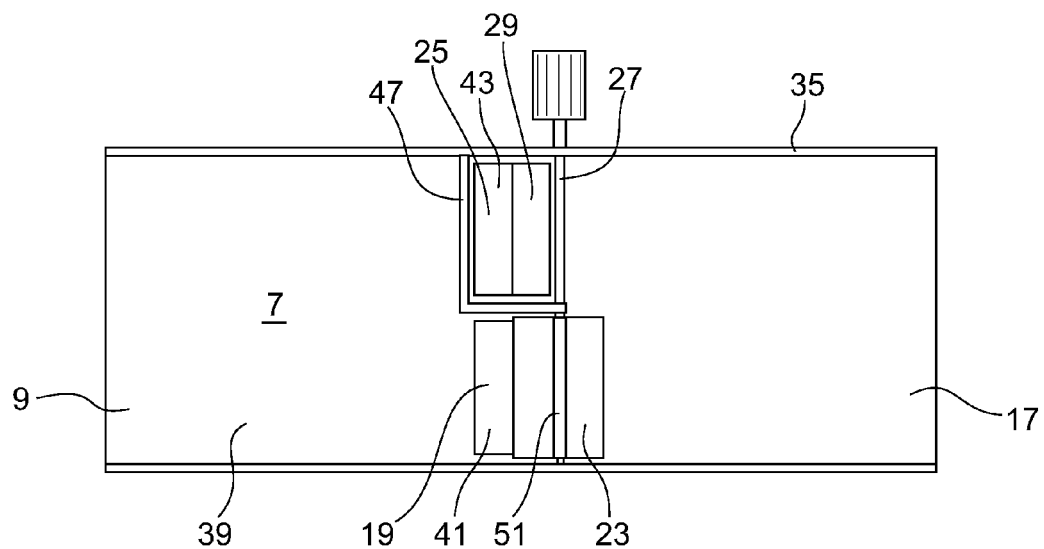
Figure 1C:
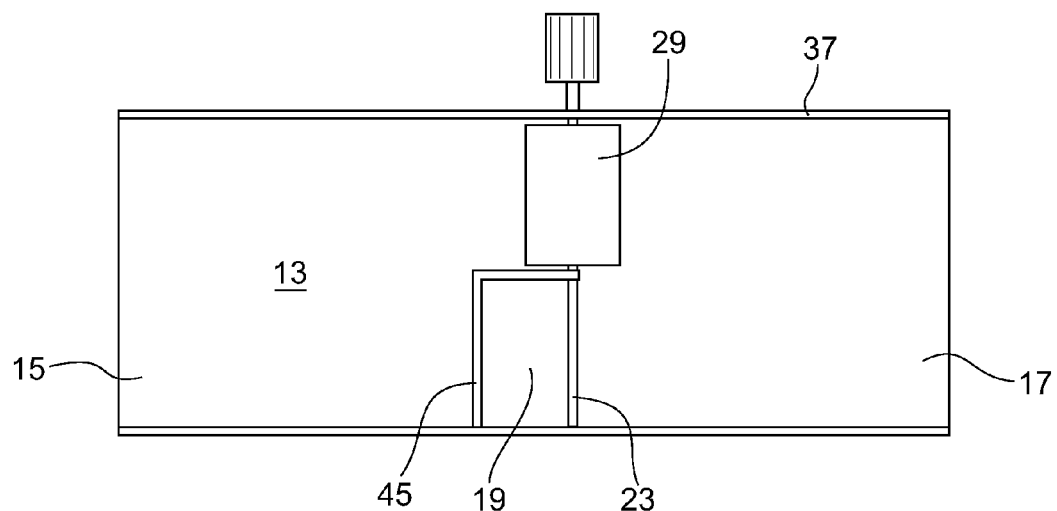
FIG. 1c shows a view from above depicting the bottom airflow channel in the ventilation device shown in FIG. 1b.
Figure 1D:
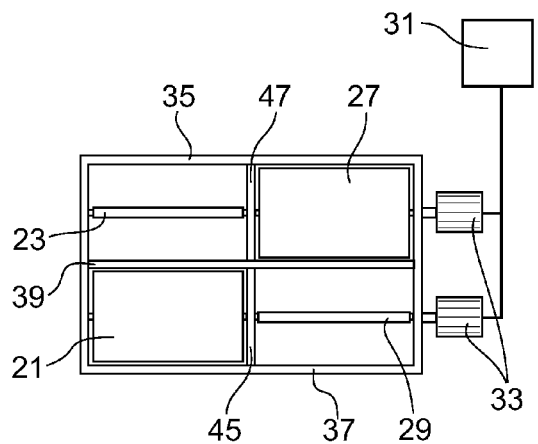

In FIG. 1a-f, one example of a ventilation device 1 according to the invention is shown. The ventilation device 1 is adapted to control the flow paths of a first 3 and a second 5 airflow to alternately flow to a first 6 and a second 8 heat-absorbing body in order to achieve a heat transfer between the two airflows. Thus in a first state of the device 1, the first airflow 3 passes the first body 6 so that the first body acquires the temperature of the first airflow, while the second airflow 5 passes the second body 8 so that the second body acquires the temperature of the second airflow. In a following second state of the device 1 the first airflow 3 is directed to pass through the second body 8, while the second airflow 5 is directed to pass through the first body 6. By letting the device alternate between being in the first and the second states, so that the airflows alternate between passing through the first 6 and the second 8 bodies, a heat transfer is achieved between the two airflows.

The first body 6 is in this example arranged on top of the second body 8, but in another example the bodies may of course be arranged in any other suitable manner and may also be positioned apart from each other. The bodies 6, 8 are adapted to be connected with the device 1, which is indicated by the dashed lines in FIGS. 1a and 1e. In this example the heat-absorbing bodies each comprises a plurality of stacked metal plates having a plurality of channels formed between the plates.

The device 1 further comprises a first airflow channel 7 adapted for conducting an airflow through the airflow channel. The first airflow channel 7 comprises a first end 9 adapted to receive or exhaust the first airflow 3, and a second end 11 adapted to be communicating with the first body. Correspondingly, the device 1 comprises a second airflow channel 13 comprising a first end 15 adapted to receive or exhaust the second airflow and a second end 17 adapted to communicate with the second body. In this example, the first airflow channel 7 is positioned on top of the second airflow channel 13 in order for the device to be adapted to the positions of the two heat-absorbing bodies.

The ventilation device 1 further comprises at least one first air passage 19 connecting the first 7 and the second 13 airflow channels and arranged for leading at least a part of the first airflow 3 from the first airflow channel 7 and into the second airflow channel 13. Thus the first airflow 3 may be directly directed into the second airflow channel 13 and further to the second body, without having to connect the airflow channels to an intermediate switching device for alternating the airflows.

Figure 1F:
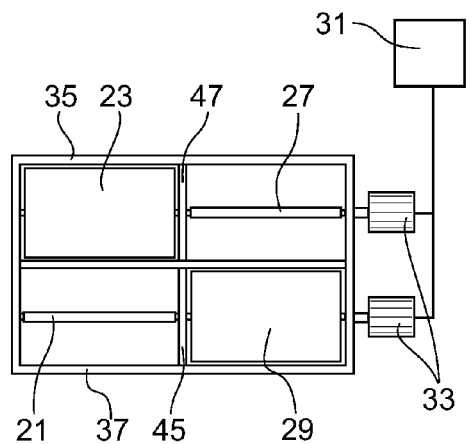
FIG. 1f shows a front view of the device in FIG. 1a in the second state.
Figure 1E:
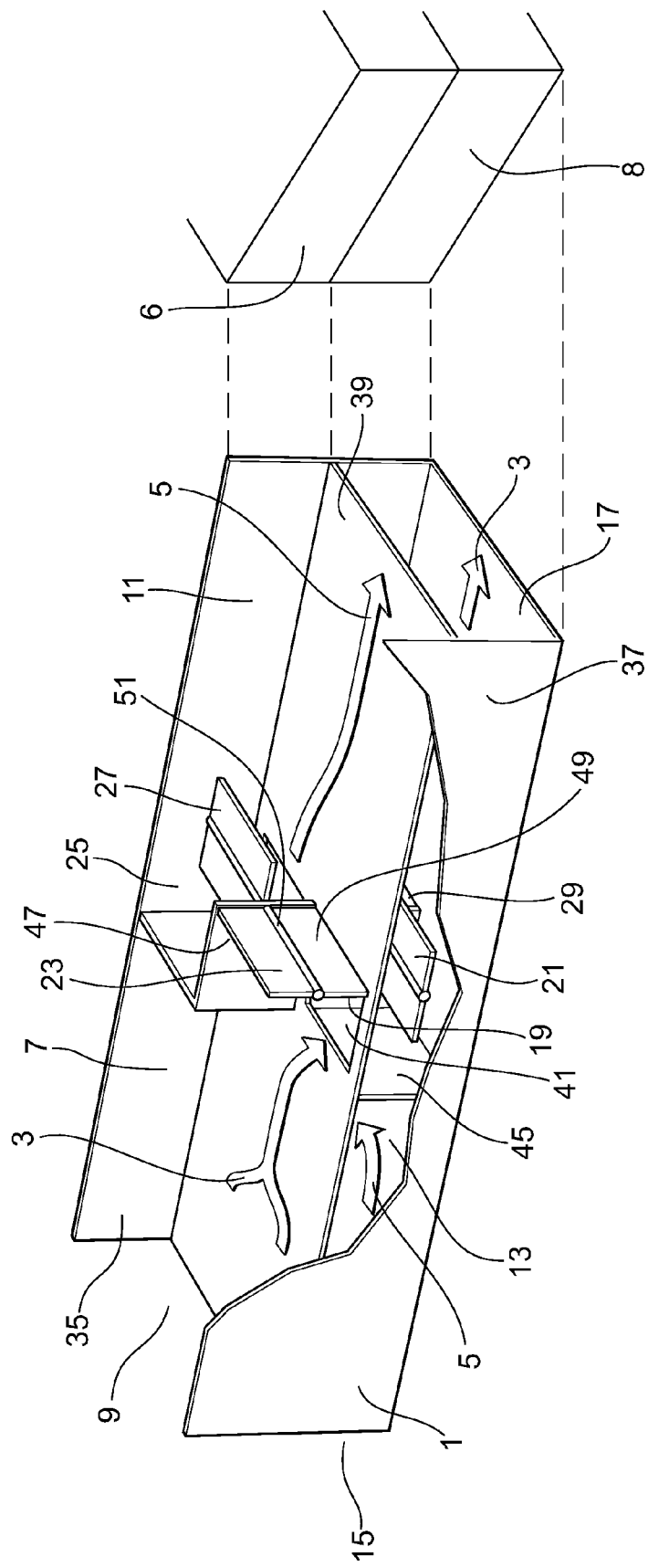
FIG. 1e show a perspective view of the ventilation device in a second state, with parts of its side-wall and roof cut open to increase visibility.

The ventilation device 1 further comprises a first airflow control member 21 adapted to admit the first airflow 3 to flow into the second airflow channel 13 through the first air passage 19 in a first, open state, as shown in FIGS. 1e-f, and to force the first airflow 3 to continue in the first airflow channel 7 in a second, closed state, as shown in FIGS. 1a-d. Thus the first airflow control member 21 prevents at least a major part of the first airflow 3 from flowing into the second airflow channel 13 through the first air passage 19 in the second state. Hence, by changing the state of the first airflow control member 21, the first airflow 3 may be controlled to either pass through the first body by letting the first airflow continue through the first airflow channel, or to pass through the second body, by admitting the first airflow 3 into the second channel 13.

The ventilation device further comprises a second airflow control member 23 adapted to admit the first airflow 3 to flow past the first air passage 19 and to continue through the first airflow channel 7 in a first, open state, and to force the first airflow 3 into the air passage 19 in a second, closed state, so as to prevent the first airflow 3 from flowing through the first airflow channel 7. Hence a larger part, and preferably almost all, of the first airflow 3 will be directed into the second airflow channel 13, when the second airflow control member 23 is in its second state.

The device 1 also comprises a second air passage 25 between the first 7 and the second 13 airflow channels, arranged for leading at least a part of the second airflow 5 from the second airflow channel 13 and into the first airflow channel 7. The ventilation device 1 further comprises a third airflow control member 27 adapted to admit the second airflow 5 to flow into the first airflow channel 7 through the second air passage 25, in a first, open state, and to force the second airflow 5 to continue through the second airflow channel 13, in a second, closed state. Thus the second airflow 5 is prevented from flowing into the first airflow channel 7 through the second air passage 25, in the second, closed state. The device also comprises a fourth airflow control member 29 adapted to admit the second airflow 5 to flow past the second air passage 25 and to continue through the second airflow channel 13 in a first, open state, and to force the second airflow 5 into the second air passage 25 in a second, closed state, so as to prevent the second airflow 5 from flowing through the second airflow channel 13.

The ventilation device 1 is arranged to alternate between being in a first or a second state for directing the airflows 3, 5 between the first and the second bodies. In the first state of the ventilation device 1, as depicted in FIGS. 1a-d, the first 21 and the third 27 airflow control members are in their second, closed states, while the second 23 and fourth 29 airflow control members are in their first, open states. Hence the first 3 and the second 5 airflows are controlled to pass straight through the first 7 and the second 9 airflow channels, respectively. In the second state of the ventilation device 1, as shown in FIGS. 1e-f, the first 21 and third 27 airflow control members are in their first, open states, and the second 23 and fourth 29 airflow control members are in their second, closed states. Hence the first 3 and second 5 airflows are controlled to enter the first 19 and the second 25 air passages, respectively, so that the first airflow 3 flows from the first airflow channel 7 and into the second airflow channel 13 through the first air passage 19, and the second airflow 5 flows from the second airflow channel 13 and into the first airflow channel 7 through the second air passage 25. By providing air passages 19, 25 between the two airflow channels the airflows may thus be directed and alternated from within the airflow channels, rather than leading the airflows to a separate device for alternating the airflows.

The ventilation device further comprises a control module 31 arranged to control the state of the ventilation device 1. In this example the control module 31 is adapted to control the states of at least one airflow control module 21, 23, 27, 29. The control module 31 may comprise a micro-computer containing a computer program, or a control circuit, for processing signals or other data pertaining to the operation of the device 1. The control module 31 may further be connected with a mechanical control system for controlling the movement of the airflow control member or members. In this example the control module 31 comprises drive units in the form of two electrical engines 33 for moving the control members, but in another example the control module may comprise drive units in the form of pneumatics. In this example the control module 31 is further designed to comprise several parts, but in another example the control module may be integrated into a single unit.

The control module 31 is adapted to control the first 21 and the second 23 airflow control members to alternate between being in the first and the second states, respectively. In order to direct at least a major part, in this example at least 98%, of the first airflow 3 to the respective airflow channels 7, 13, the control module 31 is adapted to control the first 21 and the second 23 airflow control members to be in different states at the same time. Thus the first airflow control member 21 will be in its open state so as to admit the first airflow 3 to enter the first air passage 19, while the second airflow control module 23 will be in its second state so as to prevent the airflow 3 from continuing through the first airflow channel 7, and to force the airflow 3 into the air passage 19. The control module 31 is similarly adapted to control both the third 27 and the fourth 29 airflow control modules to be in different states at the same time.

In order to alternate both airflows 3, 5 simultaneously, the control module 31 is further adapted to control the first 21 and the third 27 airflow control modules to be in the same states at the same time, and to control the second 23 and the fourth 29 airflow control members to be in the same states at the same time. Thus both the first 3 and the second 5 airflows will be controlled to alternate between either passing straight through the channels or to switch between the channels.

In this example the ventilation device comprises a first casing 35 arranged to form a hollow defining the first airflow channel 7. The first casing 35 may for example comprise metal plates bended and welded into the desired shape for the casing 35. The ventilation device 1 also comprises a similar, second casing 37 adapted to define the second airflow channel 13 inside the casing 37. The first 35 and second 37 casings are in this example joined with each other for at least a portion of the length of the first 7 and second 13 airflow channels. In this example the casings 35, 37 are joined for at least a major part of the length of the airflow channels. By joining the casings 35, 37 together the distance between the airflow channels is short, so that the device 1 will be very compact and so that the device will be provided as a single body. In this example the first 35 and the second 37 casings also share a common partition wall 39 separating the first 7 and the second 13 airflow channels from each other for at least a portion of the length of the channels, in this example for the major portion of the length of the channels. Thus the partition wall 39 forms part of the wall for both the first 7 and the second 13 airflow channel simultaneously.

The air passages 19, 25 are in this example arranged in connection with the joined portions of the casings 35, 37. Thus the air passages 19, 25 are short, since the distance between the two airflow channels 7, 13 is short. In this example the first 19 air passage comprises a first opening 41 in the partition wall 39, wherein the first airflow 3 may easily pass from the first channel 7 and into the second channel 13 through the opening 41. The second air passage 25 similarly comprises an opening 43 in the partition wall for admitting the second airflow 5 into the first airflow channel 7.

In this example, the opening 41 to the first air passage 19, has a width, which is smaller than or equal to the width of the first airflow channel 7, in this example smaller than or equal to half of the width of the partition wall 39, which is the wall of the first airflow channel 7 in which the opening 41 is arranged. The first opening 41 is further positioned mainly to one side of the surface of the partition wall 39, in this example the opening is positioned completely within one half of the wall surface in the length direction thereof. Correspondingly, the second opening 43 to the second air passage 25, also has a width, which is smaller than or equal to the width of the first airflow channel 7, in this example smaller than or equal to half of the width of the partition wall 39. The two openings 41, 43 are furthermore arranged side-by-side, in level with each other and positioned on different halves of the partition wall 39. Thus the first and the second airflows may pass between the two channels, through the openings 41, 43, in level with each other but on different halves of the airflow channels.

The ventilation device also comprises a first internal wall 45 arranged to prevent the second airflow 5 from entering the first air passage 19. The internal wall 45 is also arranged to separate the openings 41, 43 to the air passages 19, 25 from each other. In this example the first internal wall is arranged to at least partly surround the opening 41 in order to prevent the second airflow 5 from entering the opening 41 and the first air passage 19. Thus, mixing of the two airflows is avoided. The first internal wall 45 is further arranged to cooperate with the first airflow control member 21 for preventing the second airflow from entering the first air passage 19. In this example the first internal wall 45 is arranged to form an opening to the second channel for letting the first airflow out of the air passage 19, which opening is covered by the first airflow control member 21. Hence the airflow may be regulated and controlled by changing the state of the airflow control member 21.

In this example both the first airflow control member 21 and the internal wall 45 are arranged inside the space formed by the second airflow channel 13. Since the airflow channels are large to allow a large airflow, there is sufficient space for accommodating the internal wall and the control member. In this example the first wall 45 comprises one part arranged perpendicular to the flow direction of the airflows through the device, and arranged on the opposite side of the opening 41 in the partition wall 39 relative to the airflow control member 21. The perpendicular part of the wall section is furthermore connected with the side-wall of the casing 35.

The internal wall 45 further comprises a part arranged longitudinally with the flow direction through the device and in parallel with the side-wall of the casing 35. The longitudinal part is positioned on the opposite side of the opening 41 in the partition wall 39 relative to the side-wall of the casing 35. Hence the internal wall section 45 surrounds the opening on all sides in conjunction with the side-wall of the casing and with the first airflow control member 21. The internal wall 45, in cooperation with the side-wall of the casing 35, further defines part of the air passage 19.

The device 1 further comprises a corresponding second internal wall 47 arranged inside the space of the first channel 7, and arranged to at least partly surround the opening 43 in the partition wall 39 for preventing the first airflow from entering the second air passage 25 in conjunction with the third airflow control member 27.

In this example the airflow control members 21, 23, 27, 29 each comprises a shutter plate 49 mounted on a rotatable shaft 51. Thus the airflow control members are rotatable between their respective first and second states. In this example the shutter plates are mounted on a rotatable shaft passing through the middle of the shutter plate and arranged in the same plane as the extension of the shutter plate. Thus the moment of inertia when rotating the shutter plates is decreased, so that the energy consumption for driving the rotation is also decreased. The use of shutter plates arranged on such rotatable shafts gives very efficient and durable control members for controlling the airflow in the device 1.

In this example the first 21 and the fourth 29 airflow control members are mounted on the same shaft, so that the first and fourth airflow control members rotate with each other. Similarly, the second 23 and the third 27 control members are also mounted on the same shaft. Thus it is possible to control all four control members with only two drive units 33.

Figure 2:
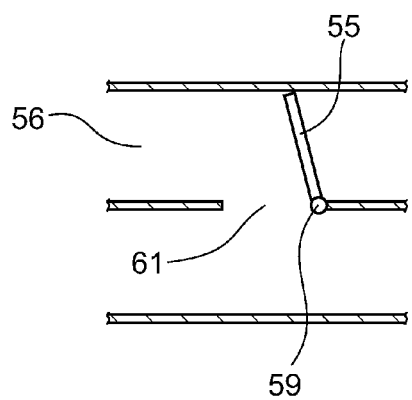
FIG. 2 shows another example of an airflow control member positioned next to an air passage according to the invention.

In FIG. 2 a second example of a construction of an airflow control member 55 arranged in an airflow channel 56 is shown. The airflow control member 55 comprises a shutter plate 57 mounted on a rotatable shaft 59 arranged along one edge of the shutter plate 57. The airflow control member 55 is further positioned in connection with an opening 61 to an air passage, so that the rotatable shaft is arranged along one edge of the opening. The shutter plate 57 is further arranged with a length equal to or longer than the height of the airflow channel 56.

In a first state the shutter plate 57 is rotated to cover the opening 61, wherein the airflow is prevented from entering the opening and continues inside the airflow channel 56. In a second state, as shown in FIG. 2, the shutter plate is rotated so that the opening 61 is left open, and so that the shutter plate make contact with the ceiling of the airflow channel 56, wherein the airflow is prevented from continuing inside the airflow channel and is forced into the opening 61 to the air passage. Thus only one shutter plate 57 is necessary for controlling the airflow.

Figure 3:
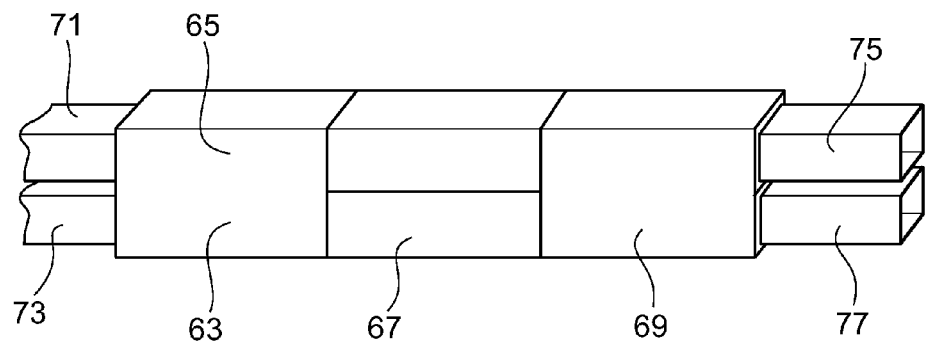
FIG. 3 shows one example of a ventilation arrangement according to one aspect of the invention.

In FIG. 3 one example of a ventilation arrangement 63 according to the invention is shown. The ventilation arrangement 63 comprises a first ventilation device 65, designed in the same manner as the ventilation device 1 described in FIGS. 1a-f. The arrangement 63 further comprises a heat-absorbing module 67 comprising two heat-absorbing bodies, wherein the heat absorbing module 67 is arranged in fluid communication with the ventilation device 65 with a first end of the module 67. The ventilation arrangement 63 further comprises a second ventilation device 69 arranged in fluid communication with a second end of the heat-absorbing module 67. Thus each of the two airflows pass through the heat absorbing module 67 and both the ventilation devices 65, 69. In this example the first ventilation device 65 is directly connected to the heat-absorbing module 67. Similarly, the second ventilation device is directly connected to the other end of the heat-absorbing module 67, for conduction of the airflows.

The ventilation devices 65, 59 are both adapted to control the airflow paths of the first and the second airflows to alternately pass between the two heat-absorbing bodies. Hence the paths of the airflows are exchanged on both sides of the heat-absorbing module 67, wherein the distance between the exchange point and the heat absorbing bodies is short. This means that the volume of air that has to be moved at each exchange of the air flows before fresh air reaches the heat-absorbing bodies is small. Thus the efficiency of the ventilation arrangement 63 increases. Furthermore, the ventilation arrangement 63 may be positioned far away from both the intake and outlets of both the indoor air and the outdoor air.

The ventilation devices 65, 69 and the heat absorbing module 67 are in this example arranged to be modular and substantially box-like with a rectangular shape, whereby the devices and the module are more easily installed. Due to the modular design of the ventilation arrangement 63 it is very easy to replace any or all of the devices 65, 69 or the module 67 by simply disconnecting and removing the desired device or module and replacing it with a new device or module in the event of failure.

In FIG. 3 external air ducts 71, 73, 75, 77 are also shown connected with the arrangement 63 for conducting an incoming and an outgoing airflow to the device. In this example the first air duct 71 is adapted to lead the incoming airflow into the device 65 from the outdoors, the second air duct 73 is adapted to lead the outgoing airflow outdoors, the third air duct 75 is adapted to lead the incoming airflow indoors, and the fourth air duct 77 is adapted to lead the outgoing airflow from indoors and into the device. The ventilation devices 65, 69 are in this example thus arranged to receive or exhaust the same airflow through the same opening to the ventilation device, wherein the openings to the ventilation devices 65, 69 are at all times connected with the same external air duct leading to an intake or outlet.

The invention is not limited to the examples shown, but may be varied freely within the framework of the following claims. In particular, the different examples described may be combined or substituted with each other, and functional part may be interchanged for other parts with a corresponding function.

Furthermore, the functioning of two different airflow control modules may be combined into a single control module, as described in relation to FIG. 2. A ventilation arrangement, or device, may comprise three or more airflow channels and heat-absorbing bodies for conducting three or more separate airflows. The airflow channels need not be joined but may be arranged separately, and connected by an air passage in the form of an air duct or the like.

The invention claimed is:

1. A heat exchange apparatus comprising:
   a first duct having a first end and a second end;
   a second duct having a first end and a second end;
   a first heat absorbing body connected to the second end of the first duct;
   a second heat absorbing body connected to the second end of the second duct;
   each of the first and second heat absorbing bodies being arranged to store heat or cool in the heat absorbing body depending on a temperature of air passing through the heat absorbing body;
   and an airflow control adapted to control the flow paths of a first airflow and a second airflow so that:
      in a first mode the first airflow passes from the first end of the first duct through the first duct to the first heat absorbing body and the second airflow passes from the first end of the second duct through the second duct to the second heat absorbing body;
      in a second mode the first airflow passes from the first end of the first duct through the first duct to the second heat absorbing body and the second airflow passes from the first end of the second duct through the second duct to the first heat absorbing body;
   the airflow control device being operable to alternate between the first and the second modes, so that the first and second airflows alternate between passing through the first and the second heat absorbing bodies so that a heat transfer is achieved between the first and second airflows by transferring stored heat or cool from the first and second heat absorbing bodies to the first and second airflows;
   said first and second ducts including a common partition wall where said partition wall defines one wall of the first airflow duct and one wall of the second airflow duct;
   wherein the airflow control device comprises:
      a first air passage between the first and the second airflow ducts arranged for leading at least a part of the first airflow from the first airflow duct into the second airflow duct, said first air passage being defined by a first opening through said common partition wall;
      a second air passage between the second and the first airflow ducts arranged for leading at least a part of the second airflow from the second airflow duct into the first airflow duct, said second air passage being defined by a second opening through said common partition wall separate from the first opening;
      a first airflow control member operable to open and close said first opening;
      and a second airflow control member operable to open and close said second opening.

* * * * *